United States Patent
Ngan et al.

(10) Patent No.: US 8,559,511 B2
(45) Date of Patent: Oct. 15, 2013

(54) METHOD AND APPARATUS FOR VIDEO CODING BY ABT-BASED JUST NOTICEABLE DIFFERENCE MODEL

(75) Inventors: King Ngi Ngan, Hong Kong (HK); Lin Ma, Hong Kong (HK); Wai-Kuen Cham, Hong Kong (HK); Yu Liu, Hong Kong (HK)

(73) Assignee: Hong Kong Applied Science and Technology Research Institute Company Limited, Hong Kong Science Park, Shatin, New Territories (HK)

(*) Notice: Subject to any disclaimer, the term of this patent is extended or adjusted under 35 U.S.C. 154(b) by 728 days.

(21) Appl. No.: 12/750,401

(22) Filed: Mar. 30, 2010

(65) Prior Publication Data

US 2011/0243228 A1    Oct. 6, 2011

(51) Int. Cl.
  *H04B 1/66* (2006.01)
  *H04N 7/12* (2006.01)
  *H04N 11/02* (2006.01)
  *H04N 11/04* (2006.01)

(52) U.S. Cl.
  USPC ............. 375/240.13; 375/240.12; 375/240.02

(58) Field of Classification Search
  None
  See application file for complete search history.

(56) References Cited

U.S. PATENT DOCUMENTS

| | | | |
|---|---|---|---|
| 5,426,512 A | 6/1995 | Watson | |
| 5,559,900 A | 9/1996 | Jayant et al. | |
| 5,629,780 A | 5/1997 | Watson | |
| 6,611,608 B1 | 8/2003 | Wu et al. | |
| 7,852,938 B2 * | 12/2010 | Shi et al. | 375/240.16 |
| 2006/0165311 A1 | 7/2006 | Watson | |
| 2007/0110327 A1 * | 5/2007 | Han | 382/251 |
| 2007/0257988 A1 | 11/2007 | Ong et al. | |
| 2010/0086063 A1 * | 4/2010 | Haskell et al. | 375/240.27 |

OTHER PUBLICATIONS

Jia, Y.; Lin, W.; Kassim, A.A.; Estimating Just-Noticeable Distortion for Video; IEEE Tran. on Circuits and Systems for Video Technology, Jul. 2006, vol. 16, No. 7, pp. 820-829.
Ma, Lin; Ngan, King Ngi; Adaptive Block-Size Transform Based Just-Noticeable Difference Profile for Images; Proc. 10th P.R. Conf. on Multimedia: Advances in MIP, pp. 1208-1218, (2009).
Mak, Chun-Man; Ngan, King Ngi; Enhancing Compression Rate by Justnoticeable Distortion Model for H.264/AVC; IEEE Int'l Symposium on Circuits and Systems 2009, pp. 609-612.

* cited by examiner

*Primary Examiner* — Mehrdad Dastouri
*Assistant Examiner* — Kristin Dobbs
(74) *Attorney, Agent, or Firm* — Ella Cheong Hong Kong; Sam T. Yip

(57) ABSTRACT

The present invention relates to method and apparatus for video coding by ABT-based just noticeable difference (JND). For building the just noticeable difference model, spatial content information (SCI) is used to represent the spatial appearance similarity between one macroblock and its sub-blocks and the motion characteristic distance (MCD) is used to represent the motion characteristics similarity between one macroblock and its sub-blocks. For intra frames, the balance strategy based on the obtained SCI of the macroblock is used to generate the ABT-based JND model. For inter frames, the balanced strategy based on the obtained SCI and MCD of the macroblock is used to generate the ABT-based JND model. Using the ABT-based JND model, the residual coefficients for each block in a frame is filtered to obtain a reduced set of residual coefficients for transmission without degradation in visual quality.

17 Claims, 6 Drawing Sheets

METHOD AND APPARATUS FOR VIDEO CODING BY ABT-BASED JUST NOTICEABLE DIFFERENCE MODEL

TECHNICAL FIELD

The present invention relates generally to digital video processing. In particular, the present invention relates to digital video coding including encoding and decoding.

BACKGROUND

Due to the advance in imaging devices, more and more videos (sequences of images, also known as, motion pictures) are being generated anytime and anywhere. Moreover, in the pursuit of higher resolution, the video size keeps increasing. These all involve a large amount of data to be handled. This poses a huge challenge in processes such as displaying, transmitting and storing the videos. Therefore, there is a need for video coding techniques so that video can be compressed without any loss to its quality.

Regarding the quality, less distortion is desired and the distortion is traditionally measured by quantitative metrics such as mean square error (MSE) and peak signal-to-noise ratio (PSNR). However, these quantitative metrics may not reflect how a human observer perceives an image and how severe the distortion is in the eyes of the human observer. Therefore, there is a need to further increase the compression ratio without introducing additional visual distortion by taking the properties of how humans perceive things visually into consideration. In other words, a subjective test of how humans perceive an image is important. Therefore, there is a need to maintain a user's visual perception while performing video processing more efficiently.

Furthermore, pursuant to the development of video standards, an increasing number of features are incorporated in current and future video standards. One of these features is to allow various block sizes in video coding processes, for example, adaptive block-size transform (ABT). This helps to improve image quality by considering the image contents. Therefore, there is a need to enable ABT in video coding, for example, in compliance with video standards such as H.264/AVC.

SUMMARY OF THE INVENTION

The present invention generates the ABT-based Just Noticeable Difference (JND) model based on the spatial content information and motion characteristics distance, which can be applied to video coding schemes by residual filtering methods. The JND model is also known as the JND profile. Since the JND model can be represented in the form of a matrix, the JND model is also referred as a JND map.

One of the advantages of the present invention is that as much as 50% bit rate can be saved by using ABT-based JND model for video coding without degradation in the subjective visual quality. The present invention makes use of the properties of how humans perceive things visually to reduce the bit rate without introducing noticeable visual distortions. A system that models the process of humans perceiving things visually is known as a visual perception model (VPM). One example of a visual perception model is the Just Noticeable Difference (JND) model. The ABT-based JND model is built and gives the JND threshold for every block in a frame so that the non-zero residual coefficients are filtered out if their values are less than the JND thresholds. If the value of a non-zero residual coefficient is larger than the corresponding JND threshold, the corresponding JND threshold will be subtracted from the non-zero residual coefficient.

In terms of the nature of the inventive JND models, unlike the existing JND models which are generated in image domain, or are based on fixed block-size DCT for JND models which are generated in frequency domain, the present invention employs ABT-based JND models which are based on different block sizes. Additionally, the ABT-based JND models take properties of how humans perceive things visually into consideration over different block-size based transforms. The ABT-based JND model is determined based on spatial content information (SCI) and the motion characteristics distance (MCD).

In terms of the applications of the inventive JND models, unlike the existing JND models which are used for image/video watermarking and quality assessment, the present invention uses JND models to enhance the video coding efficiency and reduce the bit-rates.

Furthermore, the present invention performs video coding using the ABT-based JND models without tuning the quantization matrix according to a pre-defined image quality metric.

One aspect of the present invention is to extend the fixed-size JND model to various block sizes. The JND model for various block sizes is used to capture the properties of how humans perceive things visually for different size transforms.

Another aspect of the present invention is to determine spatial content information (SCI) which depicts the spatial appearance similarity between one macroblock and its sub-blocks.

Another aspect of the present invention is to determine motion characteristic distance (MCD) which depicts the motion characteristics similarity between one macroblock and its sub-blocks.

Another aspect of the present invention is to make use of the balanced strategy between different block-size based transforms for image or intra frames based on the SCI of the macroblock.

Another aspect of the present invention is to make use of the balanced strategy between different block-size based transforms for inter frames based on the SCI and MCD of the macroblock.

Another aspect of the present invention is to perform residual filtering for different size transforms to preserve the same visual quality with bit-rate reduction.

Other aspects of the present invention are also disclosed as illustrated by the following embodiments.

BRIEF DESCRIPTION OF THE DRAWINGS

These and other objects, aspects and embodiments of this claimed invention will be described hereinafter in more details with reference to the following drawings, in which:

DETAILED DESCRIPTION OF THE INVENTION

Figure 1:
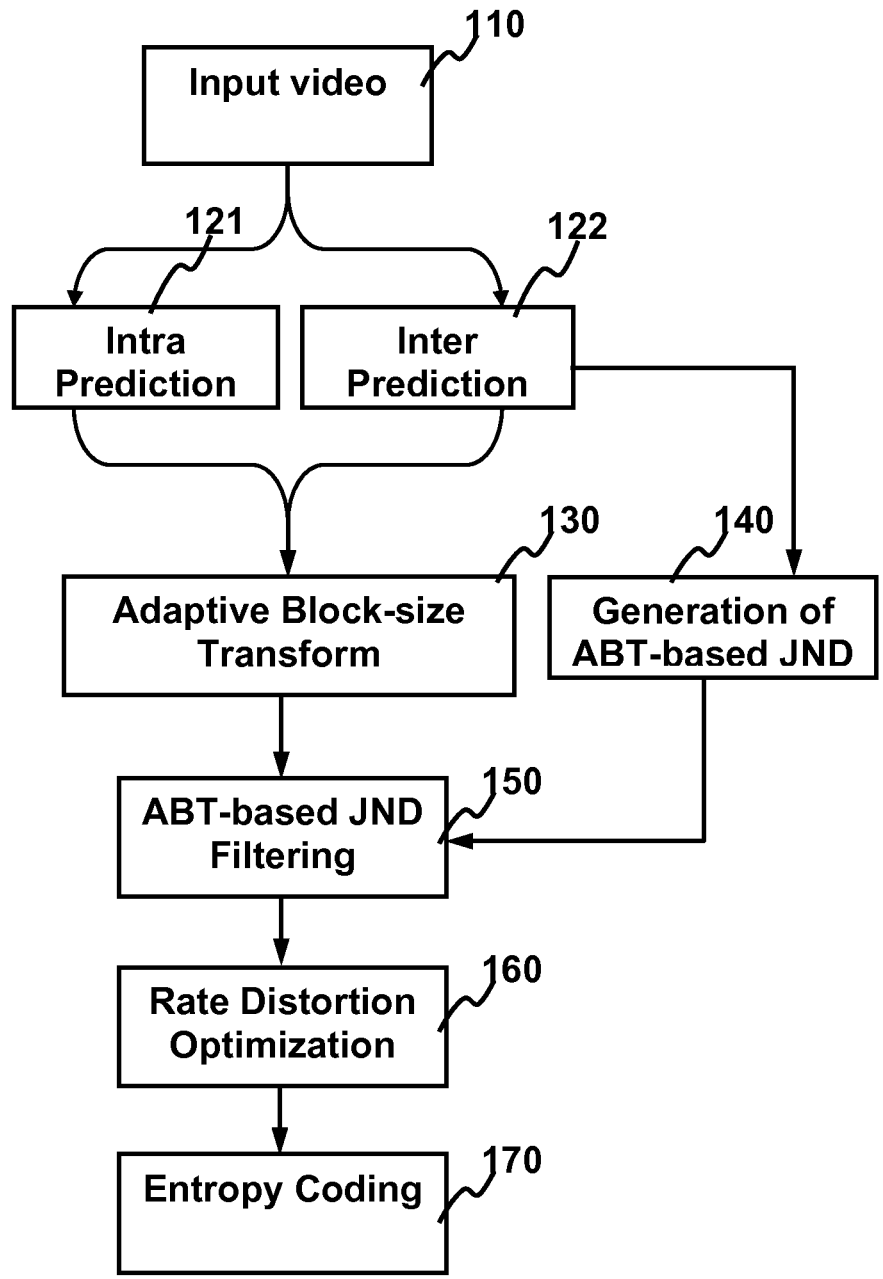
FIG. 1 shows a flowchart of an exemplary embodiment of video coding provided by the present invention.

FIG. 1 shows a flowchart of an exemplary embodiment of video coding provided by the present invention. In one embodiment, video coding is performed on an input video 110 and the input video 110 is encoded. To encode the input video 110, the JND model for each block of various block sizes in each frame in the input video 110 is computed. Examples of possible block sizes are, but not limited to, 4×4, 8×8 and 16×16.

For each macroblock, a prediction is computed based on either intra prediction 121 or inter prediction 122. For example, inter prediction 122 is used when the frame is a P frame or a B frame. Intra prediction 121 is based on different block sizes such as 4×4, 8×8, 16×16 and is also known as different block-size intra prediction. Inter prediction 122 is based on different block sizes such as 4×4, 8×8, 16×16 and is also known as different block-size inter prediction.

A difference block is generated from the difference between the prediction and the block. The difference block is also known as residual. The residual is partitioned into different configurations of non-overlapping blocks for encoding depending on the block size of the residual. The following information are also computed:

(1) Block types, for example, inter, or intra;
(2) Block categorizations, for example, plane, edge, or texture; and
(3) Motion vectors for blocks of different sizes.

The above information is employed to compute the Just-Noticeable Difference (JND) model 140. According to one of the embodiments, it is assumed that the JND model 140 is initially developed for an 8×8 discrete cosine transform (DCT) block based on Jia's model as described in Jia, Y.; Lin, W.; Kassim, A. A.; *Estimating Just-Noticeable Distortion for Video*; IEEE Transactions on Circuits and Systems for Video Technology, Vol. 16, No. 7, pp. 820-829, July 2006, and the disclosure of which is incorporated herein by reference in its entirety. The JND model 140 for 8×8 DCT block can be extended to other block sizes as described below.

Let X be the block to be encoded, $X_p$ be the prediction of X. The residual $X_r$, as defined in the equation (1) below, is transformed, quantized, and encoded.

$$X_r = X - X_p \quad (1)$$

The residual $X_r$ are transformed by adaptive block-size transform (ABT) 130, also known as, different block-size transform, for example, by different block-size discrete cosine transform (DCT) to compute the transformed residual Y. The transformed residual, Y, is defined in the equation (2) below:

$$Y = T(X_r) \quad (2)$$

where T represents the ABT on residual $X_r$. The quantized transformed residual, $Y_q$, is defined in the equation (3) below:

$$Y_q = Q(Y) \quad (3)$$

where Q represents the quantization operation.

The ABT-based JND model 140 is computed for the block X. The ABT-based JND model 140, denoted as $J_X(u,v)$, is a matrix or a map containing JND thresholds over which the observer starts to notice any distortion for each residual coefficient. The computation of the JND thresholds will be further discussed later.

Let Y(u,v) be the $(u,v)^{th}$ transformed residual coefficient of the residual $X_r$. If the Y(u,v) has a magnitude smaller than $J_X(u,v)$, the transformed residual coefficient Y(u,v) can be discarded. If the Y(u,v) has a magnitude larger than $J_X(u,v)$, the transformed residual coefficient Y(u,v) is subtracted by $J_X(u,v)$. The processing of the transformed residual coefficient Y(u,v) is also known as a filtering step 150 (ABT-based JND filtering). In one embodiment, the ABT-based JND filtering step 150 is implemented before quantization and the filtering computation is defined in the equation (4) below:

$$Y_j(u,v) = \begin{cases} \text{sign}(Y(u,v)) \times & \text{if } |Y(u,v)| > J_X(u,v), \\ (|Y(u,v)| - J_X(u,v)) & \\ 0 & \text{otherwise} \end{cases} \quad (4)$$

where $Y_j$ is the JND-filtered transformed block. The sign function ensures Y(u,v) to be negative or positive after filtering. Since the residual coefficients are filtered, the reconstructed block $X_j'$ is computed by the equation (5) below:

$$X_j' = X_p + T^{-1}(Q^{-1}(Y_{j,q})) \quad (5)$$

where $Y_{j,q}$ is the quantized $Y_j$.

The distortion d between the reconstructed block $X_j'$ and the block X is defined in the equation (6) below:

$$d = \|X_j' - X\|_1 \quad (6)$$

where the distortion d is equal to the sum of absolute difference (SAD) between the reconstructed and the original block. Other difference metrics such as, but not limited to, sum of squared difference (SSD) or sum of absolute transformed difference (SATD) can also be used for rate distortion optimization (RDO) 160.

Let E be the DCT transformed difference between the original block and reconstructed block and E is computed in the equation (7) below:

$$E = T(X_j' - X) \quad (7)$$

E is filtered by $J_X$ as in the above equation (4) and the filtering is computed by the equation (8) below, $$E_j(u,v) = \begin{cases} \text{sign}(E(u,v)) \times & \text{if } |E(u,v)| > J_X(u,v), \\ (|E(u,v)| - J_X(u,v)) & \\ 0 & \text{otherwise} \end{cases} \quad (8)$$

For the term "filtering", the following operations is performed: If the E(u,v) has a magnitude smaller than $J_X(u,v)$, the DCT transformed difference E(u,v) can be discarded. If the E(u,v) has a magnitude larger than $J_X(u,v)$, the DCT transformed difference E(u,v) is subtracted by $J_X(u,v)$. Then the distortion $d_j$ is computed from the inverse transform of $E_j$, as shown in the equation (9) below, and used in the rate distortion optimization 160:

$$d_j = \|T^{-1}(E_j)\|_1 \quad (9)$$

If rate distortion optimization 160 is enabled, the prediction mode chosen for the block is the one that minimizes the RD (rate distortion) cost. For example, the RD cost is defined as the equation (10) below:

$$R = d + \lambda L \quad (10)$$

where λ is a Lagrangian multiplier and L is the actual bit length of encoding the block with that prediction mode. For example, if the RD cost for inter prediction is lower than that for intra prediction, inter prediction will be chosen as the prediction mode for that block.

The ABT-based JND filtering step 150 can be viewed as an adaptive quantization step in which the quantizer of each block is determined from its spatial and temporal characteristics. Because the ABT-based JND filtered block will undergo normal encoding procedure, the bitstream is totally compliant to the H.264 standard and can be decoded correctly by any decoder.

The selected transform mode together with the filtered residual coefficients is coded by the entropy coding 170. After different block-size transforms and the ABT-based JND filtering are performed, the total distortion of the macroblock and its required bits are computed. In accordance with the total distortion of the macroblock and its required bits, the best transform mode (best transform size) is determined according to the rate distortion optimization. The ABT-based JND model 140 is related with the transform mode, no other bits need to be encoded.

Figure 2:
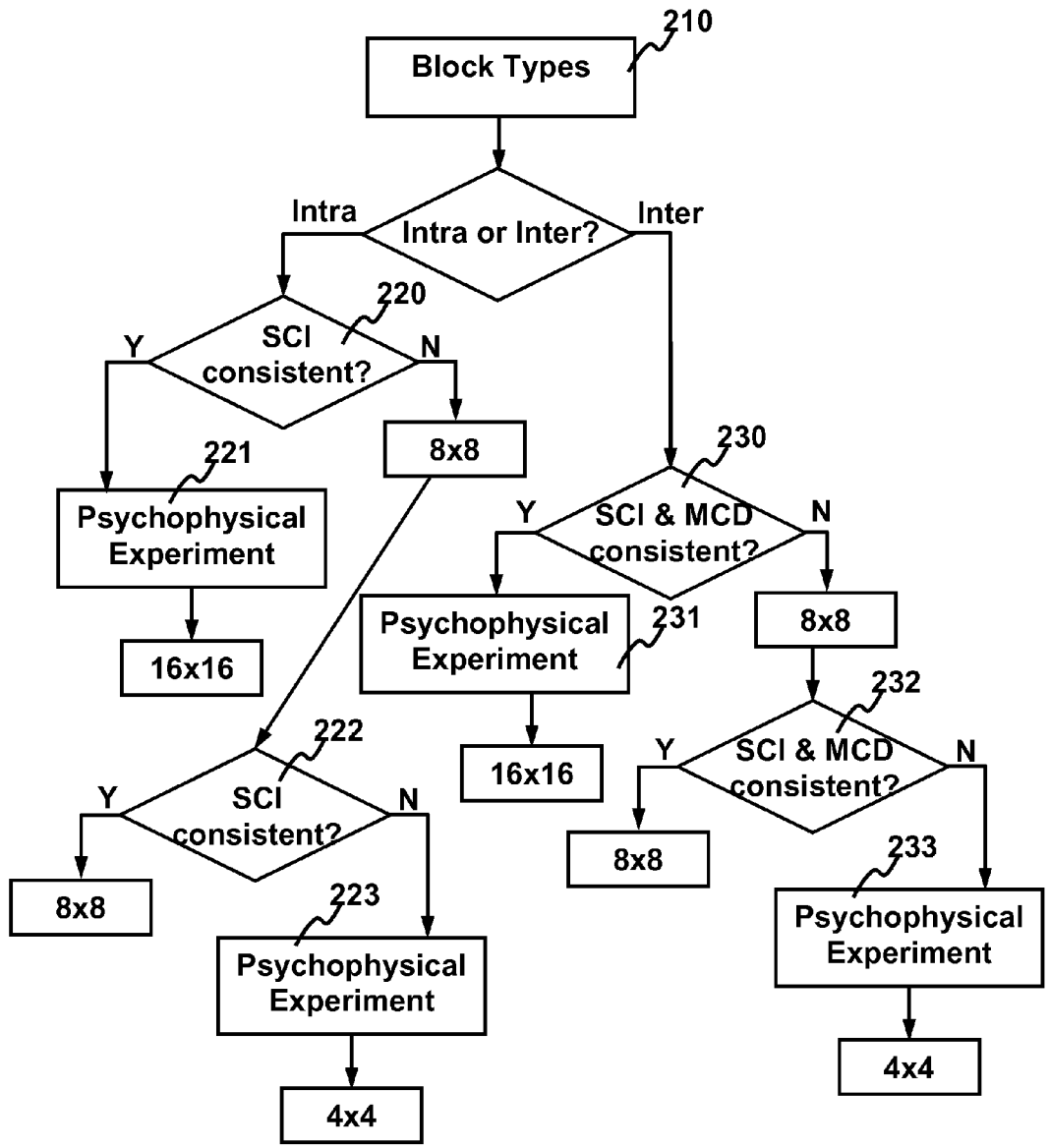
FIG. 2 shows a flowchart of an exemplary embodiment of generation of an ABT-based JND model.

FIG. 2 shows a flowchart of an exemplary embodiment of generation of the ABT-based JND model. In order to generate the ABT-based JND model, we need to determine the block type 210. If it is an inter block, a balanced strategy in terms of both spatial and temporal characteristics is applicable. If it is an intra block, only spatial balanced strategy is applicable. In one embodiment, the 8×8 DCT based JND model is used and is extended to different block-size DCT based JND models such as 16×16 DCT based JND model and 4×4 DCT based JND model. The details concerning adaptive block-size transform (ABT) based just-noticeable difference (JND) model for images are described in Ma, Lin; Ngan, King N.; *Adaptive Block-Size Transform Based Just-Noticeable Difference Profile for Images*; Proceedings of the 10$^{th}$ Pacific Rim Conference on Multimedia: Advances in Multimedia Information Processing, Session 13: Advanced Image Processing Techniques; Page 1208-1218; 2009, the disclosure of which is incorporated herein by reference to its entirety.

An automatic JND model can be determined in the image domain, or transform domain, such as DCT and discrete wavelet transform (DWT), or even the combination of these two schemes. To accurately describe how humans perceive things visually, a JND model generated in the transform domain, which is also known as the subband-based JND, may incorporate all the major affecting factors. The major affecting factors include, but are not limited to, spatial contrast sensitivity function (CSF), luminance adaptation effect and contrast masking.

ABT allows different transform sizes. Different transform sizes are adopted according to the general strategy that larger transforms are used to provide better energy compaction and better preservation of details, while smaller transforms could prevent more ringing artifacts during compression. The present invention allows the ABT-based JND model to make use of the different performance of how humans perceive things visually if different transform sizes are used. During the extension, a psychophysical experiment is carried out to parameterize the spatial CSF to take account of the properties of how humans perceive things visually. The content of an image is also adaptively adjusted to decide which transform size is employed to yield the resulting ABT-based JND model.

For an intra block, the spatial balanced strategy 220 is used to determine if the spatial content information (SCI) is consistent in the block. If the spatial content information of a 16×16 block is consistent according to the spatial balanced strategy 220, then the block size of the DCT is selected to be 16×16. The 16×16 DCT is utilized to generate the ABT-based JND model. The resulting ABT-based JND model is based on the block size of 16×16 according to the psychophysical experiment 221 based on the block size of 16×16. If the spatial content information of the 16×16 block is not consistent, then the 16×16 block is divided into 8×8 blocks. Subsequently, for each 8×8 block, if the spatial content information of the 8×8 block is consistent according to the spatial balanced strategy 222, then the block size of the DCT is selected to be 8×8. The 8×8 DCT is utilized to generate the ABT-based JND model. The resulting ABT-based JND model is based on the block size of 8×8. If the spatial content information of the 8×8 block is not consistent, then the block size of the DCT is selected to be 4×4, the 4×4 DCT is utilized to generate the ABT-based JND model. The resulting ABT-based JND model is based on the block size of 4×4 according to the psychophysical experiment 223 based on the block size of 4×4.

For an inter block, the spatial and temporal balanced strategies 230 are used to determine if the spatial content information (SCI) of the 16×16 block is consistent and if the motion characteristic distance (MCD) of the 16×16 block is consistent. If both the SCI and the MCD are consistent according to the spatial and temporal balanced strategies 230, then the block size of the DCT is selected to be 16×16. The 16×16 DCT is utilized to generate the ABT-based JND model. The resulting ABT-based JND model is based on the block size of 16×16 according to the psychophysical experiment 231 based on the block size of 16×16. If the SCI or the MCD is not consistent, then the 16×16 block is divided into 8×8 blocks. Subsequently, for each 8×8 block, the spatial and temporal balanced strategies 232 are used to determine if the SCI of the 8×8 block is consistent and the MCD of the 8×8 block is consistent. If both the SCI and the MCD are consistent according to the spatial and temporal balanced strategies 232, then the block size of the DCT is selected to be 8×8. The 8×8 DCT is utilized to generate the ABT-based JND model. If the SCI or the MCD is not consistent, then the block size of the DCT is selected to be 4×4. The 4×4 DCT is utilized to generate the ABT-based JND model. The resulting ABT-based JND model is based on the block size of 4×4 according to the psychophysical experiment 233 based on the block size of 4×4.

Spatial Balanced Strategy

Just Noticeable Difference (JND) is the smallest detectable difference between a starting and secondary level of a particular sensory stimulus in psychophysics. JND is also regarded as a difference limen or a differential threshold. In general, the JND model can be expressed in form of the following equation (11):

$$T_{JND} = T_{JND_S} \times T_{JND_T} \qquad (11)$$

where $T_{JND_S}$ is the spatial JND and $T_{JND_T}$ is the temporal JND modulation factor. In the inter frames, the intra prediction is also needed for processing the blocks which are not suitable for motion estimation. Because these blocks depend more on their spatial neighboring blocks than the temporal frames. Consequently, these blocks are regarded as containing spatial information only and are modeled by the spatial JND model which follows the spatial balanced strategy.

The spatial JND model in the DCT domain is determined by the following equation (12):

$$T(m,n,i,j) = T_{basic}(i,j) \cdot \alpha_{lum}(m,n) \cdot \alpha_{cm}(m,n,i,j) \qquad (12)$$

where (m,n) denotes the position of DCT block in an image, (i,j) indicates the DCT subband (i,j), $T_{basic}$ is the basic visibility threshold generated from spatial contrast sensitivity function (CSF); $\alpha_{lum}$ is the luminance adaptation; $\alpha_{cm}$, is the contrast masking; and T(m,n,i,j) is the spatial JND threshold as obtained.

Basic Visibility Threshold

The basic visibility threshold, $T_{basic}$, is defined as the inverse of the contrast sensitivity of spatial frequency which is the sensitivity of human visual perception over spatial frequency and is modeled by the following equation (13):

$$H(\omega)=(a+b\omega)\cdot\exp(-c\omega) \quad (13)$$

where $\omega$ is the specified spatial frequency. As JND threshold is the inverse of the sensitivity modeled by the equation (13), the basic JND threshold is modeled by the equation (14) below:

$$T_{basic}(m, n, i, j) = \frac{s}{\phi_i \phi_j} \cdot \frac{\exp(c\omega_{i,j})/(a+b\omega_{i,j})}{\gamma + (1-\gamma)\cdot\cos^2\varphi_{ij}} \quad (14)$$

where s=0.25 denotes the summation effect factor, and $\phi_i$, $\phi_j$ are the DCT normalization factors as defined in the equation (15) below:

$$\phi_m = \begin{cases} \sqrt{1/N}, & m = 0 \\ \sqrt{2/N}, & m > 0 \end{cases} \quad (15)$$

N stands for the dimension of the DCT block. And $\phi_{ij}$ denotes the directional angle of the corresponding DCT coefficient as shown in the equation (16) below:

$$\varphi_{ij} = \arcsin(2\omega_{i,0}\omega_{0,j}/\omega_{i,j}^2) \quad (16)$$

where $\omega_{i,j}$ is the corresponding spatial frequency of DCT subband (i,j) and is defined in the equation (17) below:

$$\omega_{i,j}=(1/(2N))\sqrt{(i/\theta_x)^2+(j/\theta_y)^2} \quad (17)$$

where $\theta_x$ and $\theta_y$ are horizontal and vertical visual angles respectively and are given by the following equation (18):

$$\theta_x=\theta_y=2\cdot\arctan(1/(2\cdot R_d\cdot P_h)) \quad (18)$$

where $R_d$ indicates the ratio of viewing distance to image height, and $P_h$ is the image height (in pixel). The parameters (a, b, c) are defined and computed in the following paragraphs.

Luminance Adaption

Luminance adaption, $\alpha_{lum}$, is used to represent how easily a difference can be noticed against different luminance. For example, there is a higher visibility threshold in either dark or bright regions to denote the fact that it is more difficult to notice any difference, while there is a lower visibility threshold in medium bright regions to denote the fact that it is easier to notice any difference. The luminance adaption is based on the average intensity $I_{ave}$ of the DCT block and is given by the following equation (19):

$$\alpha_{lum} = \begin{cases} (60 - I_{ave})/150 + 1 & I_{ave} \leq 60 \\ 1 & 60 < I_{ave} < 170 \\ (I_{ave} - 170)/425 + 1 & I_{ave} \geq 170 \end{cases} \quad (19)$$

where $I_{ave}$ is the average intensity value of the whole DCT block.

Contrast Masking

Contrast masking, $\alpha_{cm}$, is used to refer to the reduction in the visibility of one visual component in the presence of another one. For example, noise will be less visible in a textured region but will be more visible in a smooth region or an edge region. Therefore, $\alpha_{cm}$ varies according to block categorization and is given by the following equation (20):

$$\alpha_{cm} = \begin{cases} \Psi, & \text{for } (i^2+j^2) \leq 16 \text{ in Plane and Edge Block} \\ \Psi\cdot\min\left(4, \max\left(1, \left(\frac{C(m,n,i,j)}{T_{basic}(m,n,i,j)\times\alpha_{lum}(m,n,i,j)}\right)^{0.36}\right)\right), & \text{others} \end{cases} \quad (20)$$

where $\Psi = \begin{cases} 1, & \text{for Plane and Edge Block} \\ 2.25, & \text{for } (i^2+j^2) \leq 16 \text{ in Texture Block} \\ 1.25, & \text{for } (i^2+j^2) > 16 \text{ in Texture Block} \end{cases}$ As one embodiment, the block categorization is the one implemented in the image domain. Firstly, Canny edge detector is utilized to mark the edge pixels in the image domain. Secondly, based on the number of edge pixels in the block, the block can be categorized into three types, namely PLANE, EDGE, and TEXTURE, respectively. For example, for a 16×16 macroblock, block categorization is defined according to:

$$\text{Block\_Categorization} = \begin{cases} \text{PLANE} & \sum_{Edge} < 16 \\ \text{EDGE} & 16 \leq \sum_{Edge} \leq 52 \\ \text{TEXTURE} & \sum_{Edge} > 52 \end{cases} \quad (21)$$

where $\Sigma_{edge}$ is the number of edge pixels in a given macroblock.

In one embodiment, the temporal JND model is determined by the following equation (20):

$$T_{JND_T} = \begin{cases} 1, & f_s < 5cpd \ \& f_t < 10 \text{ Hz} \\ 1.07^{(f_t-10)}, & f_s < 5cpd \ \& f_t \geq 10 \text{ Hz}_t \\ 1.07^{f_t}, & f_t > 5cpd_s \end{cases} \quad (22)$$

where $f_t=f_{sx}v_x+f_{sy}v_y$; $f_{sx}$, $f_{sy}$, are horizontal spatial frequency and vertical spatial frequency respectively; and $v_x$, $v_y$ is the velocity of object motion on the retina plane along the horizontal direction and along the vertical direction, respectively.

Balanced Strategy for JND Profile Between Different Block-Size Transforms

After the extension of the 8×8 to 16×16 as well as to 4×4, three JND profiles based on different block-size transforms will have been obtained. The smaller block-size DCT would result in better energy compaction and detailed information preservation, while the larger block-size DCT could represent the content and characteristics of local image blocks more efficiently.

Spatial Balanced Strategies for Intra Frames

TABLE 1

(Balanced strategy among 16x16, 8x8 and 4x4 JND profiles)

| 16x16 macroblock type | 8x8 sub-block type | JND Profile |
| --- | --- | --- |
| PLANE | All 8x8 sub-blocks are PLANE | 16x16 macroblock PLANE |
|  | Otherwise | Table 2 |
| EDGE | All 8x8 sub-blocks are EDGE | 16x16 macroblock EDGE |
|  | Otherwise | Table 2 |
| TEXTURE | All 8x8 sub-blocks are TEXTURE | 16x16 macroblock TEXTURE |
|  | Otherwise | Table 2 |

For intra frames, the image is firstly divided into 16×16 macroblocks. The block categorization is employed as the basis for balancing different JND profiles. As shown in table 1, the first column represents the 16×16 macroblock type, while the second column represents the 8×8 sub-block categorization. And the third column is the decision for generating the resulting JND profile. For example, if the 16×16 macroblock is marked as PLANE and all the 8×8 sub-blocks in the macroblock are also marked as PLANE, the 16×16 DCT-based JND model is adopted for its advantage in energy compaction and preserving detail information. Otherwise, the JND profile determination process will continue as in the following Table 2:

TABLE 2

(Balanced strategy among 16x16, 8x8 and 4x4 JND profiles) - continued

| 8x8 sub-block type | 4x4 sub-block type | JND Profile |
| --- | --- | --- |
| PLANE | All 4x4 sub-blocks are PLANE | 8x8 sub-block PLANE |
|  | Otherwise | 4x4 sub-block |
| EDGE | All 4x4 sub-blocks are EDGE | 8x8 sub-block EDGE |
|  | Otherwise | 4x4 sub-block |
| TEXTURE | All 4x4 sub-blocks are TEXTURE | 8x8 sub-block TEXTURE |
|  | Otherwise | 4x4 sub-block |

For example, if the 8×8 sub-block is marked as PLANE and all the 4×4 sub-blocks in the 8×8 sub-block are also marked as PLANE, 8×8 DCT-based JND model will be adopted for each 8×8 sub-block in the 16×16 macroblock according to the different information and characteristics of the 8×8 sub-block, for example, whether the block type is PLANE or EDGE or TEXTURE. Otherwise, the 4×4 DCT-based JND model will be employed for each 4×4 sub-block, by considering different content information and characteristics of the 4×4 sub-blocks, for example, whether the block type is PLANE or EDGE or TEXTURE.

Temporal Balanced Strategy for Inter Frames

Temporal properties between a block and its sub-blocks are used for the balanced strategy for inter frames. In one embodiment, the motion vector is utilized to represent the motion characteristic of the object. Motion Characteristic Distance (MCD) represents the motion characteristic similarity between one macroblock and its sub-blocks. The MCD is determined by the following equation (23):

$$MCD = \sqrt{\sum_{i=0}^{N-1} [(MV_{s\_i\_x} - MV_{M\_x})^2 + (MV_{s\_i\_y} - MV_{M\_y})^2]} \Big/ N \quad (23)$$

where $MV_{s\_i}$ is the motion vector of sub-block, while $MV_{M\_i}$ is the motion vector the macroblock.

If MCD is smaller than a threshold, and the spatial content information is consistent, a larger DCT based JND will be utilized. Otherwise, smaller DCT based JND will be employed.

Figure 5:
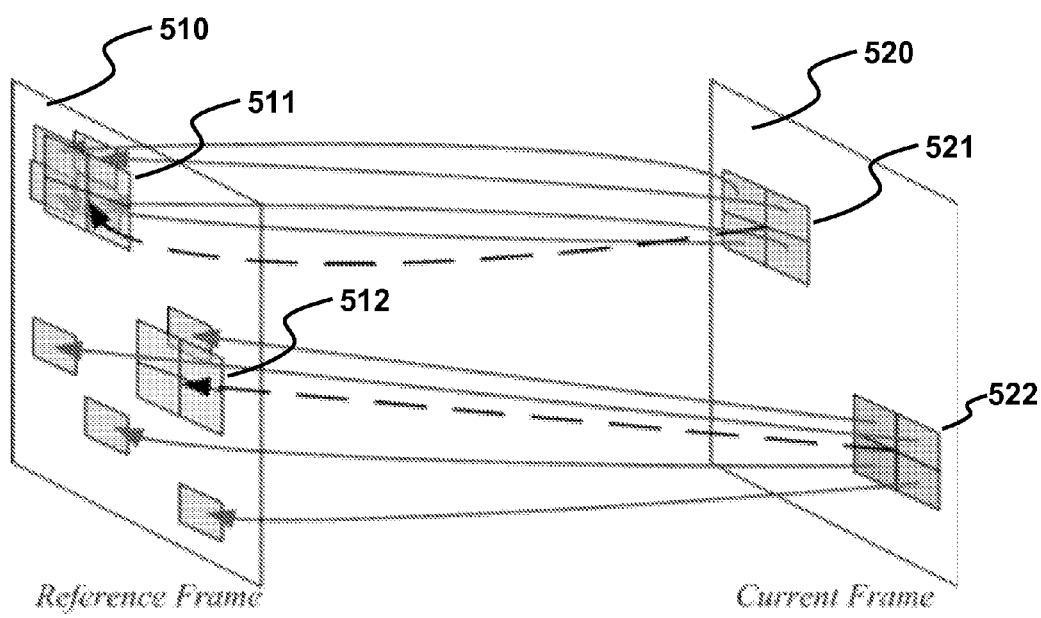
FIG. 5 depicts motion vectors of macroblocks and the corresponding subblocks to illustrate the concept of MCD consistency for the temporal balanced strategy for inter frames.

FIG. 5 depicts motion vectors of macroblocks and the corresponding sub-blocks to illustrate the concept of MCD consistency for the temporal balanced strategy for inter frames. FIG. 5 shows a current frame 520 and its reference frame 510. The macroblock 521 in the current frame 520 has a motion vector pointing to the corresponding macroblock 511 in the reference frame 510. The macroblock 522 in the current frame 520 has a motion vector pointing to the corresponding macroblock 512 in the reference frame 510. It is shown that the motion vectors of the sub-blocks of macroblock 521 are more consistent with the motion vector of the macroblock 521 when compared with those motion vectors of the sub-blocks of macroblock 522. It is likely that the MCD for macroblock 522 is larger than the MCD for macroblock 521 and even over the threshold.

Psychophysical Experiment

Figure 4:
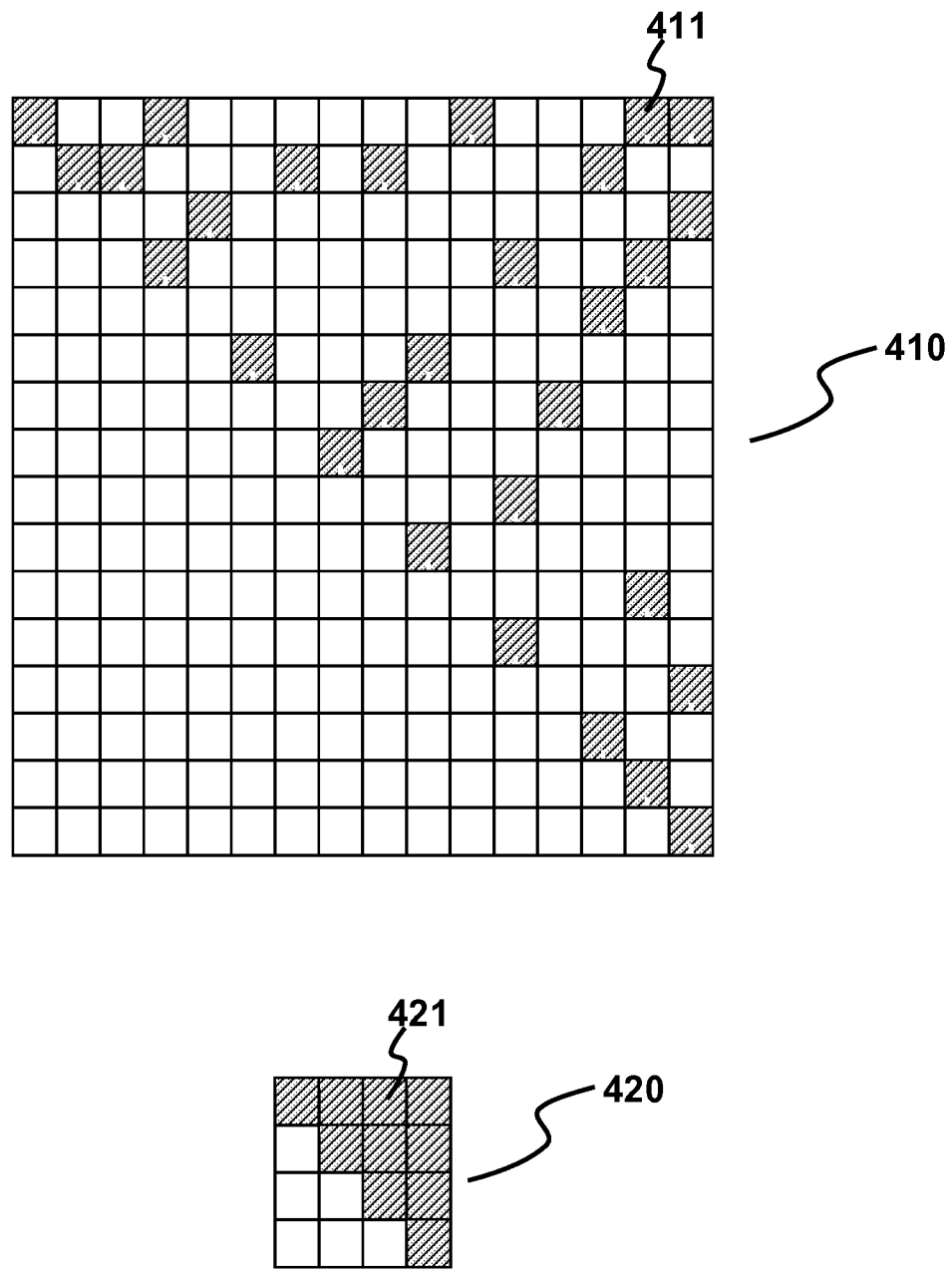
FIG. 4 shows an exemplary allocation of test DCT sub-bands in a 16×16 block and a 4×4 block respectively in one embodiment.

FIG. 4 shows an exemplary allocation of test DCT subbands in a 16×16 block and a 4×4 block respectively in one embodiment. In one embodiment of a 16×16 block 410, test DCT subbands are represented by shaded cells, such as cell 411, and are allocated as depicted in the figure. In one embodiment of a 4×4 block 420, test DCT subbands are represented by shaded cells such as cell 421 and are allocated as depicted in the figure. As shown in FIG. 4, the test DCT subbands are allocated such that at least one test DCT subband is located on each row and on each column, the test DCT subbands cover low frequencies, middle frequencies and high frequencies, and at least one DCT subband is located on each diagonal. Noise is added to certain spatial frequency subbands of 16×16 and 4×4 DCT individually. For each test DCT subband, a plurality of amplitudes of noise for each subband are chosen based on the pre-designed measurements. Viewers give their opinions on whether the noise can be perceived. If yes, the noise amplitude will be reduced. In contrast, the noise amplitude will be increased if the noise cannot be perceived. After the experiment, the just noticeable difference thresholds for the selected DCT subbands can be obtained.

The JND model has directionality, which presents as most sensitive to the horizontal and vertical frequency components and least sensitive to the diagonal components. This perceptual performance is also named as the "oblique effect."

During parameterization, at least one DCT subband is located on each row and on each column, at least one DCT subband is located on each diagonal, and the DCT subbands are preferred to cover low frequencies, middle frequencies, and high frequencies.

Least mean squared error is employed to fit the obtained JND threshold to the equation (24) below:

$$(a, b, c) = \underset{\omega_{ij}}{\mathrm{argmin}} \sum [T_{\omega_{ij}} - T_{basic}(m, n, i, j)]^2 \quad (24)$$

where $T_{\theta_{ij}}$ is the JND threshold obtained from the psychophysical experiment.

Figure 3:
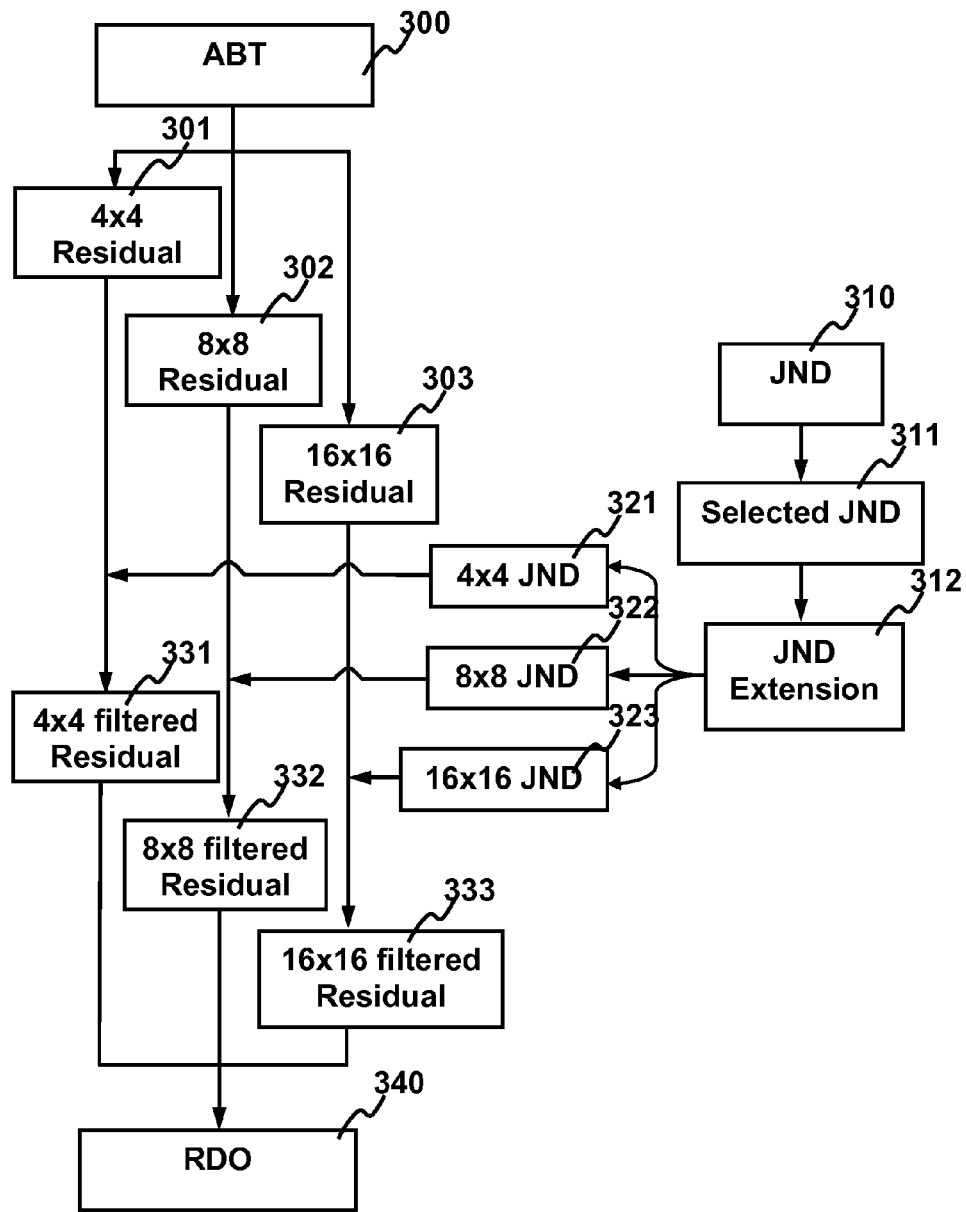
FIG. 3 shows a flowchart of an exemplary embodiment of ABT-based JND filtering.

FIG. 3 shows a flowchart of an exemplary embodiment of the ABT-based JND filtering. In one embodiment, 4×4 residuals 301, 8×8 residuals 302, and 16×16 residuals 303 are obtained from the ABT 300 according to different transform sizes of DCT.

Through the generation of JND model 310, the selected JND model 311 is generated, which may be 4×4 JND model, 8×8 JND model, or 16×16 JND model. Furthermore, there are two types of JND models for each transform size, namely spatial JND model for intra macroblock and temporal JND model for inter macroblock.

In order to make the JND model compatible with the ABT-transform, the selected JND model is extended to different block-size based JND model by JND extension 312. In JND extension 312, the information such as the block type, block categorization, and motion vectors for different blocks are utilized to generate different block-size based JND models for each block. Therefore, 4×4 JND model 321, 8×8 JND model 322, and 16×16 JND model 323 are obtained for filtering the transformed residual coefficients.

$$\hat{E}_{typ} = \begin{cases} 0, & \text{if } E_{typ} \le JND_{typ} \\ \text{sign}(E_{typ}) \cdot (|E_{typ}| - JND_{typ}), & \text{otherwise} \end{cases} \quad (25)$$

Equation (25) represents the filtering process. "typ" denotes the block size for the DCT transform and the JND model. $E_{typ}$ is the transformed residual coefficients according to different block sizes, $JND_{typ}$ is the generated JND, which may be 4×4 JND model 321, 8×8 JND model 322, or 16×16 JND model 323. $\hat{E}_{typ}$ is the filtered coefficients.

After filtering, 4×4 filtered residual coefficients 331, 8×8 filtered residual coefficients 332, or 16×16 filtered residual coefficients 333 are obtained. The residual coefficients together with the prediction mode information will be processed by the rate distortion optimization (RDO) 340 for choosing the best prediction mode. Therefore, when rate distortion is enabled, the prediction mode chosen for the block is the one that minimizes the rate distortion cost. In one embodiment, the rate distortion cost is defined as R=d+λL where λ is a Lagrangian multiplier and L is the actual bit length of encoding the block with that prediction mode.

Figure 6:
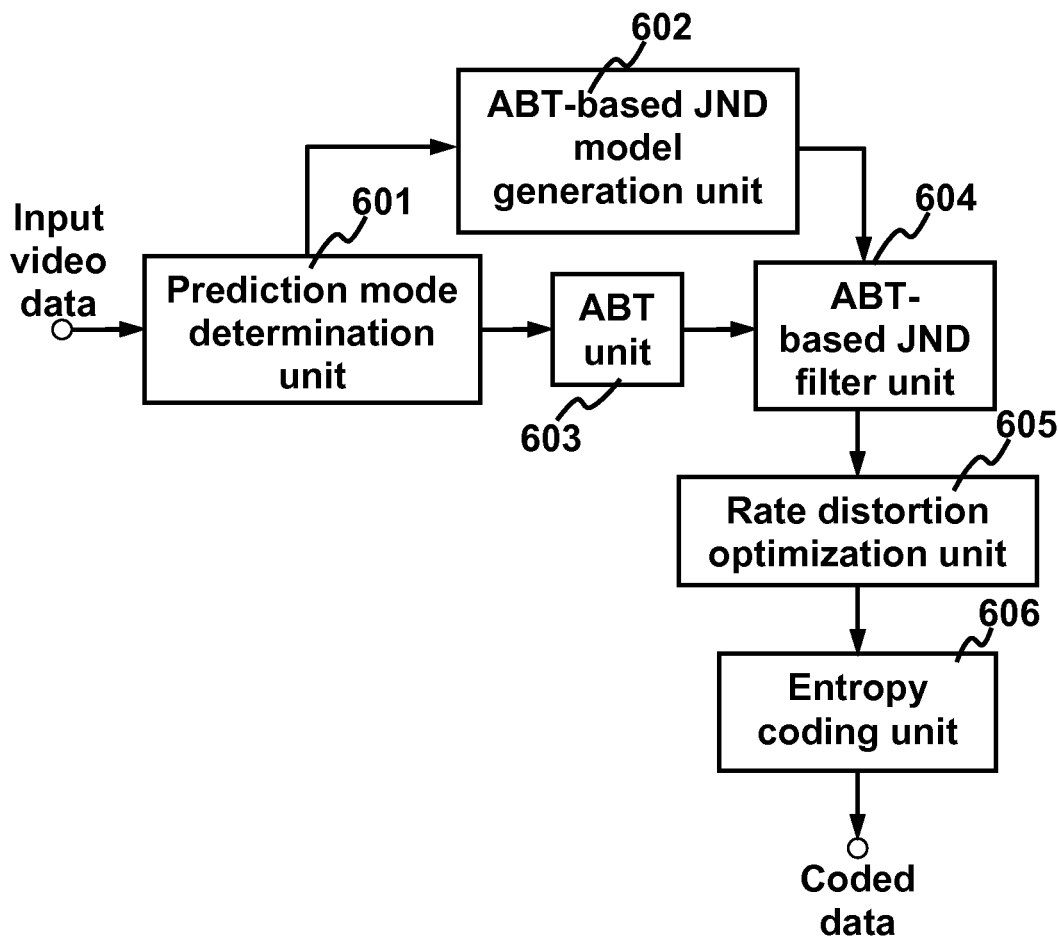
FIG. 6 depicts a block diagram for an exemplary embodiment of a video coding apparatus according to one embodiment.

FIG. 6 depicts a block diagram for an exemplary embodiment of a video coding apparatus provided by the present invention. Various components as described below can be implemented as one or more processors. The prediction mode determination unit 601 operates on input video data and determines whether a frame in the video signal is an inter frame or an intra frame according to the prediction mode of the frame. The ABT unit 603 performs adaptive block transform on the input video data to generate DCT transformed signal of various block sizes. On the other hand, the ABT-based JND model generation unit 602 generates an ABT-based JND model based on the following information as described above:

(1) Block types, for example, inter, or intra;

(2) Block categorizations, for example, plane, edge, or texture; and (3) Motion vectors for blocks of different sizes.

The ABT-based JND model contains one or more JND thresholds as determined by a psychophysical experiment based on the visual perception model. The ABT-based JND model generation unit 602 computes the ABT-based JND model for the intra frame based on spatial content information according to the spatial balanced strategy as described above. The ABT-based JND model generation unit 602 also computes the ABT-based JND model for the inter frame based on spatial content information and temporal characteristics according to the spatial and temporal balanced strategy as described above.

The ABT-based JND filter unit 604 filters one or more residual coefficients by discarding one or more residual coefficients which are below the JND thresholds of the ABT-based JND model so that a signal with filtered residual coefficients is output. Based on the filtered residual coefficients, the rate distortion optimization unit 605 determines the rate distortion cost to select the best prediction mode by lowering the rate distortion cost if rate distortion optimization unit is enabled.

The entropy coding unit 606 then computes the coded data after coding the filtered residual coefficients.

Embodiments of the present invention may be implemented in the form of software, hardware, application logic or a combination of software, hardware and application logic. The software, application logic and/or hardware may reside on integrated circuit chips, modules or memories. If desired, part of the software, hardware and/or application logic may reside on integrated circuit chips, part of the software, hardware and/or application logic may reside on modules, and part of the software, hardware and/or application logic may reside on memories. In one exemplary embodiment, the application logic, software or an instruction set is maintained on any one of various conventional non-transitory computer-readable media.

Processes and logic flows which are described in this specification can be performed by one or more programmable processors executing one or more computer programs to perform functions by operating on input data and generating output. Processes and logic flows can also be performed by special purpose logic circuitry, e.g., an FPGA (field programmable gate array) or an ASIC (application-specific integrated circuit).

Apparatus or devices which are described in this specification can be implemented by a programmable processor, a computer, a system on a chip, or combinations of them, by operating on input date and generating output. Apparatus or devices can include special purpose logic circuitry, e.g., an FPGA (field programmable gate array) or an ASIC (application-specific integrated circuit). Apparatus or devices can also include, in addition to hardware, code that creates an execution environment for computer program, e.g., code that constitutes processor firmware, a protocol stack, a database management system, an operating system, a cross-platform runtime environment, e.g., a virtual machine, or a combination of one or more of them.

Processors suitable for the execution of a computer program include, for example, both general and special purpose microprocessors, and any one or more processors of any kind of digital computer. Generally, a processor will receive instructions and data from a read-only memory or a random access memory or both. The elements of a computer generally include a processor for performing or executing instructions, and one or more memory devices for storing instructions and data.

Computer-readable medium as described in this specification may be any media or means that can contain, store, communicate, propagate or transport the instructions for use by or in connection with an instruction execution system, apparatus, or device, such as a computer. A computer-readable medium may comprise a computer-readable storage medium that may be any media or means that can contain or store the instructions for use by or in connection with an instruction execution system, apparatus, or device, such as a computer. Computer-readable media may include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

A computer program (also known as, e.g., a program, software, software application, script, or code) can be written in any programming language, including compiled or interpreted languages, declarative or procedural languages, and it can be deployed in any form, including as a stand-alone program or as a module, component, subroutine, object, or other unit suitable for use in a computing environment. A computer program can be deployed to be executed on one computer or on multiple computers that are located at one single site or distributed across multiple sites and interconnected by a communication network.

Embodiments and/or features as described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with one embodiment as described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The whole specification contains many specific implementation details. These specific implementation details are not meant to be construed as limitations on the scope of the invention or of what may be claimed, but rather as descriptions of features specific to particular embodiments of the invention.

Certain features that are described in the context of separate embodiments can also be combined and implemented as a single embodiment. Conversely, various features that are described in the context of a single embodiment can also be implemented in multiple embodiments separately or in any suitable subcombinations. Moreover, although features may be described as acting in certain combinations and even initially claimed as such, one or more features from a combination as described or a claimed combination can in certain cases be excluded from the combination, and the claimed combination may be directed to a subcombination or variation of a subcombination. Although various aspects of the invention are set out in the independent claims, other aspects of the invention comprise other combinations of features from the embodiments and/or from the dependent claims with the features of the independent claims, and not solely the combinations explicitly set out in the claims.

Certain functions which are described in this specification may be performed in a different order and/or concurrently with each other. Furthermore, if desired, one or more of the above-described functions may be optional or may be combined.

The above descriptions provide exemplary embodiments of the present invention, but should not be viewed in a limiting sense. Rather, it is possible to make variations and modifications without departing from the scope of the present invention as defined in the appended claims.

What is claimed is:

1. A video coding apparatus, comprising:
a unit for providing a video signal;
a prediction mode determination unit that determines whether a frame in the video signal is an inter frame or an intra frame according to the prediction mode of the frame;
an adaptive block-size transform (ABT)-based just noticeable difference (JND) model generation unit that makes use of one or more performance properties of how humans perceive things visually for different block-size based transforms and computes block types, block categorizations and motion vectors for block of different sizes to generate an ABT-based JND model which contains one or more JND thresholds as determined by a psychophysical experiment based on the visual perception model; and
an ABT-based JND filter that filters one or more residual coefficients by discarding one or more residual coefficients which are below the JND thresholds of the ABT-based JND model and subtracting the JND thresholds from one or more residual coefficients which are larger than the JND thresholds of the ABT-based JND model so that a signal with filtered residual coefficients is output;
wherein the one or more JND thresholds are thresholds over which an observer of the output signal with filtered residual coefficients starts to notice any distortion; and
wherein the one or more JND thresholds are modeled by $$T_{basic}(m, n, i, j) = \frac{s}{\phi_i \phi_j} \cdot \frac{\exp(c\omega_{i,j})/(a + b\omega_{i,j})}{\gamma + (1 + \gamma) \cdot \cos^2\varphi_{ij}}$$

where:
$T_{basic}(m, n, i, j)$ is a basic JND threshold;
(m, n) denotes the position of DCT block in an image;
s denotes the summation effect factor;
$\phi_i$ and $\phi_j$ are discrete cosine transform (DCT) normalization factors;
$\phi_{ij}$ denotes directional angle of corresponding DCT coefficient;
$\omega_{i,j}$ is corresponding spatial frequency of DCT subband (i, j);
$\gamma$ denotes the oblique effect factor; and
a, b and c are selected so as to achieve a least mean squared error in fitting JND thresholds obtained from a psychophysical experiment with the values obtained by computing $T_{basic}(m, n, i, j)$.

2. The video coding apparatus as claimed in claim 1, wherein:
the ABT-based JND model generation unit computes the ABT-based JND model for the block of intra type based on spatial content information according to a spatial balanced strategy.

3. The video coding apparatus as claimed in claim 2, wherein:
the ABT-based JND model of a larger block size is selected if the spatial content information is consistent between a block and the sub-block thereof.

4. The video coding apparatus as claimed in claim 2, wherein:

the spatial content information is determined by block categorization based on the amount of edge pixels in each block of the frame.

5. The video coding apparatus as claimed in claim 1, wherein:

the ABT-based JND model generation unit computes the ABT-based JND model for the block of inter type based on spatial content information and temporal characteristic according to a spatial and temporal balanced strategy.

6. The video coding apparatus as claimed in claim 5, wherein:

the ABT-based JND model of a larger block size is selected if the spatial content information is consistent and the temporal characteristic is consistent.

7. The video coding apparatus as claimed in claim 5 wherein:

the spatial content information is determined by block categorization based on the amount of edge pixels in each block of the frame.

8. The video coding apparatus as claimed in claim 5 wherein:

the temporal characteristic is determined by a motion characteristic distance between a block and the subblocks thereof.

9. A method for coding a video signal, comprising:

processing the video signal using the video coding apparatus of claim 1.

10. A method for coding a video signal, comprising:

providing a video signal to be coded;

determining whether a frame in the video signal is an inter frame or an intra frame according to the prediction mode of the frame;

generating an adaptive block-size transform (ABT)-based just noticeable difference (JND) model by making use of one or more performance properties of how humans perceive things visually for different block-size based transforms and computes block types, block categorizations and motion vectors for block of different sizes to generate the ABT-based JND model which contains one or more JND thresholds as determined by a psychophysical experiment based on the visual perception model; and filtering one or more residual coefficients by discarding one or more residual coefficients which are below the ABT-based JND thresholds of the ABT-based JND model and subtracting the JND thresholds from one or more residual coefficients which are larger than the JND thresholds of the ABT-based JND model so that a signal with filtered residual coefficients is output;

wherein the one or more JND thresholds are thresholds over which an observer of the output signal with filtered residual coefficients starts to notice any distortion; and wherein the one or more JND thresholds are modeled by $$T_{basic}(m, n, i, j) = \frac{s}{\phi_i \phi_j} \cdot \frac{\exp(c\omega_{i,j})/(a + b\omega_{i,j})}{\gamma + (1 + \gamma) \cdot \cos^2\varphi_{ij}}$$

where:

$T_{basic}(m, n, i, j)$ is a basic JND threshold;

(m, n) denotes the position of DCT block in an image;

s denotes the summation effect factor;

$\phi_i$ and $\phi_j$ are discrete cosine transform (DCT) normalization factors;

$\phi_{ij}$ denotes directional angle of corresponding DCT coefficient;

$\omega_{i,j}$ is corresponding spatial frequency of DCT subband (i, j);

$\gamma$ denotes the oblique effect factor; and a, b and c are selected so as to achieve a least mean squared error in fitting JND thresholds obtained from a psychophysical experiment with the values obtained by computing $T_{basic}(m, n, i, j)$.

11. The method for coding a video signal as claimed in claim 10, further comprising:

computing the ABT-based JND model for the block of intra type based on spatial content information according to a spatial balanced strategy.

12. The method for coding a video signal as claimed in claim 11, wherein:

the ABT-based JND model of a larger block size is selected if the spatial content information is consistent between a block and the sub-block thereof.

13. The method for coding a video signal as claimed in claim 11, wherein:

the spatial content information is determined by block categorization based on the amount of edge pixels in each block of the frame.

14. The method for coding a video signal as claimed in claim 10, further comprising:

computing the ABT-based JND model for the block of inter type based on a spatial content information and a temporal characteristic.

15. The method for coding a video signal as claimed in claim 14, wherein:

the ABT-based JND model of a larger block size is selected if the spatial content information is consistent and the temporal characteristic is coherent according to a spatial and temporal balanced strategy.

16. The method for coding a video signal as claimed in claim 14, wherein:

the spatial content information is determined by block categorization based on the amount of edge pixels in each block of the frame.

17. The method for coding a video signal as claimed in claim 14, wherein:

the temporal characteristic is determined by a motion characteristic distance between a block and the subblocks thereof.

* * * * *